United States Patent
Ledoux et al.

(10) Patent No.: US 10,868,458 B2
(45) Date of Patent: Dec. 15, 2020

(54) BRUSH-HOLDER REGULATOR FOR MOTOR VEHICLE ALTERNATOR

(71) Applicant: VALEO EQUIPEMENTS ELECTRIQUES MOTEUR, Creteil (FR)

(72) Inventors: Laurent Ledoux, Sorrus (FR); Henri-Charles Smaeghe, Saint Martin Boulogne (FR); Hugues Tempez, Conteville les Boulogne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 689 days.

(21) Appl. No.: 15/521,492

(22) PCT Filed: Oct. 26, 2015

(86) PCT No.: PCT/FR2015/052879
§ 371 (c)(1),
(2) Date: Apr. 24, 2017

(87) PCT Pub. No.: WO2016/066942
PCT Pub. Date: May 6, 2016

(65) Prior Publication Data
US 2017/0324310 A1    Nov. 9, 2017

(30) Foreign Application Priority Data
Oct. 27, 2014  (FR) ..................................... 14 60280

(51) Int. Cl.
*H02K 5/14*    (2006.01)
*H02K 11/33*   (2016.01)
(Continued)

(52) U.S. Cl.
CPC ............. *H02K 11/33* (2016.01); *H02K 5/141* (2013.01); *H02K 9/02* (2013.01); *H02K 5/14* (2013.01); *H02K 19/365* (2013.01)

(58) Field of Classification Search
CPC ...... H02K 19/365; H02K 13/00; H02K 11/33; H02K 11/26; H02K 9/28; H02K 19/36; H01R 39/383; H01R 39/38
(Continued)

(56) References Cited

U.S. PATENT DOCUMENTS 5,619,108 A    4/1997  Komurasaki et al.
6,989,617 B1 *  1/2006  Vandenbossche ..... H02K 5/141
                                                310/227

(Continued)

FOREIGN PATENT DOCUMENTS

CN    102195388 A  *  9/2011
CN    202333100 U  *  7/2012
(Continued)

OTHER PUBLICATIONS

CN-202333100-U (English Translation) (Year: 2012).*
CN-102195388-A (English Translation) (Year: 2011).*

*Primary Examiner* — Quyen P Leung
*Assistant Examiner* — Alexander Moraza
(74) *Attorney, Agent, or Firm* — Berenato & White, LLC

(57) ABSTRACT

The brush-holder regulator comprises a casing made from an insulating material suitable for being mounted on a rear bearing of an alternator and forming a one-piece assembly with at least one housing suitable for containing brushes allowing an electrical connection to be established with an excitation winding of a rotor of the alternator, an electronic control component (22) connected electrically to a trace circuit (21) overmoulded in the casing, and a cooling radiator (24) for the control component. According to the invention, the control component comprises a back electrode (Continued)

(225) on which the radiator (24) is mounted, the back electrode (225) and the radiator (24) being in electrical and thermal contact and rigidly attached to a portion (216) of the trace circuit.

18 Claims, 3 Drawing Sheets

(51) Int. Cl.
*H02K 19/36* (2006.01)
*H02K 9/02* (2006.01)

(58) Field of Classification Search
USPC .................................. 310/233–253, 68 R, 71
See application file for complete search history.

(56) References Cited

U.S. PATENT DOCUMENTS 9,484,787 B2   11/2016   Dugue et al.

| | | | |
|---|---|---|---|
| 2008/0211331 A1* | 9/2008 | Dubuc | H02K 11/048 310/71 |
| 2013/0009498 A1* | 1/2013 | Tisserand | H02K 11/026 310/72 |
| 2014/0022729 A1* | 1/2014 | Di Risio | H02K 11/024 361/704 |
| 2014/0367710 A1* | 12/2014 | Akiyama | H05B 33/0803 257/88 |
| 2015/0303853 A1* | 10/2015 | Ito | H02J 7/16 322/28 |

FOREIGN PATENT DOCUMENTS

| FR | 2969411 A1 | 6/2012 |
|---|---|---|
| FR | 3000853 A1 | 7/2014 |
| JP | 2010259209 A | 11/2010 |
| WO | WO2012129959 A1 | 10/2012 |

\* cited by examiner

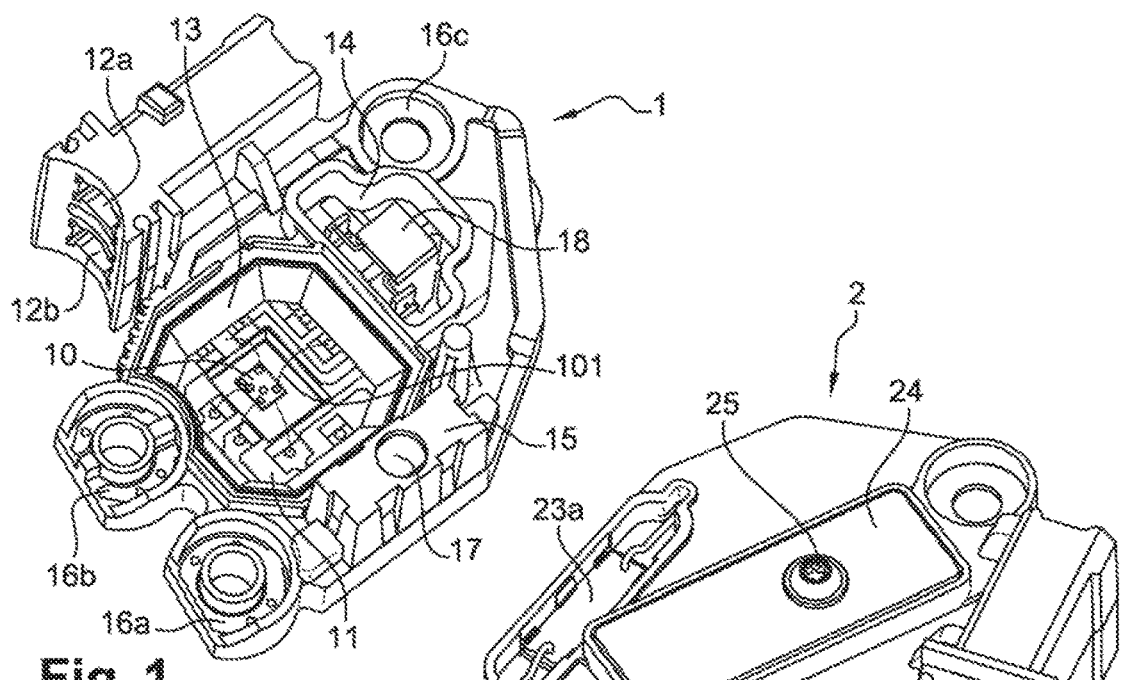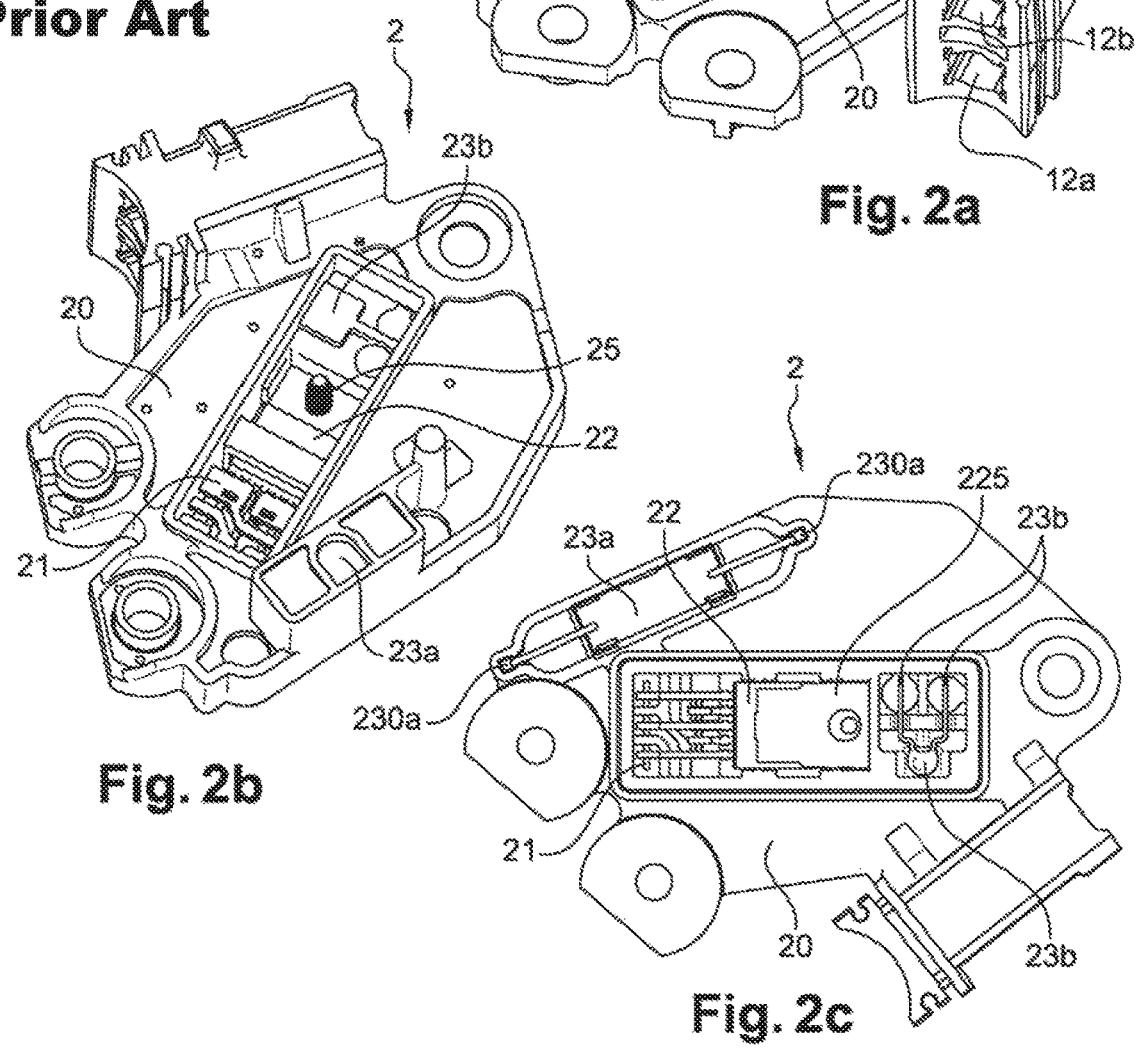
Fig. 1 Prior Art
Fig. 2a
Fig. 2b
Fig. 2c

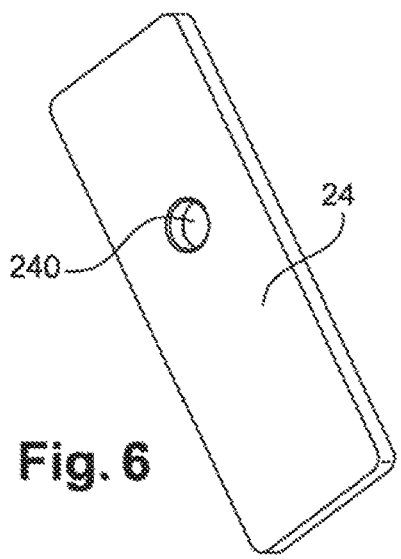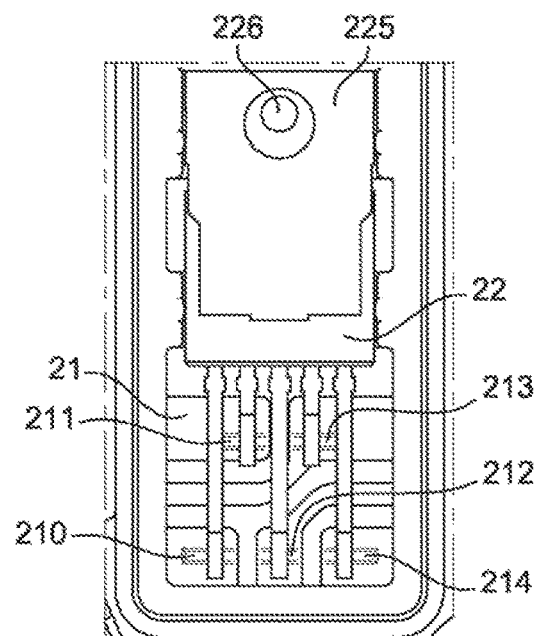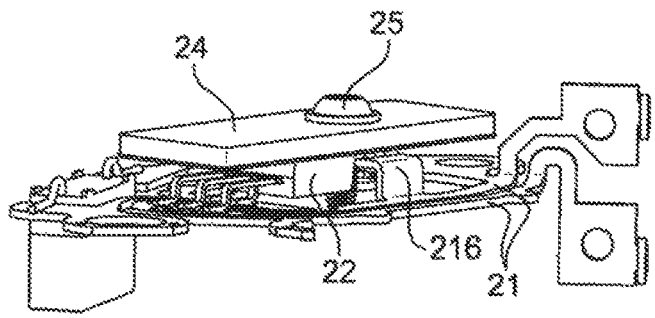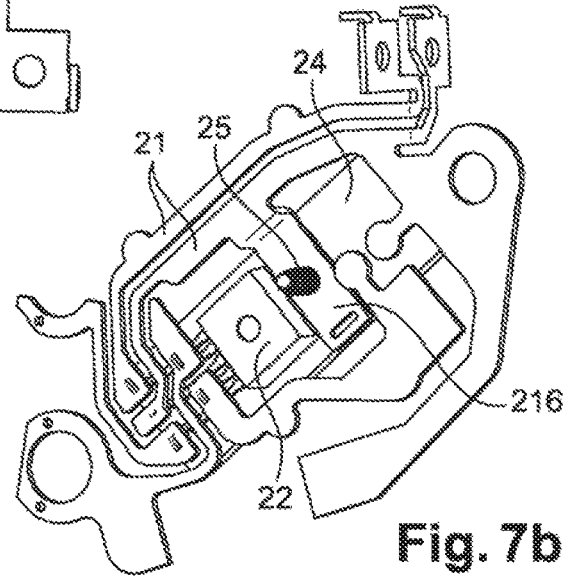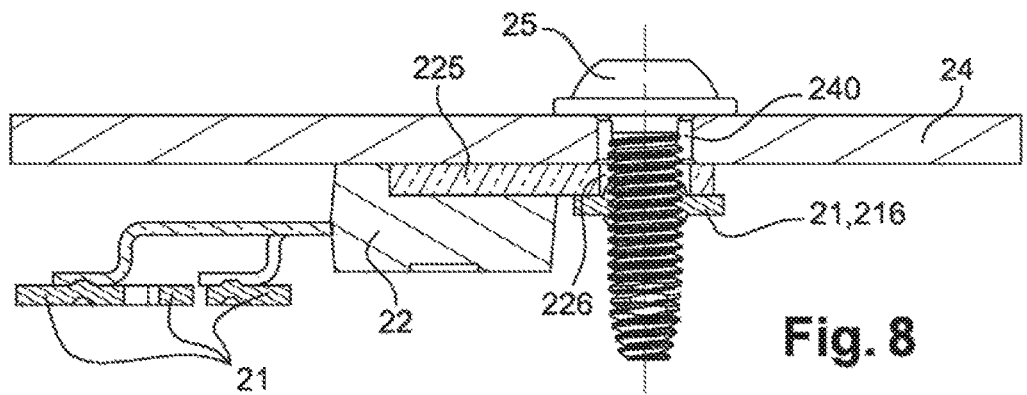

BRUSH-HOLDER REGULATOR FOR MOTOR VEHICLE ALTERNATOR

CROSS-REFERENCE TO RELATED APPLICATIONS AND CLAIM TO PRIORITY

This application is a national stage application of International Application No. PCT/FR2015/052879 filed Oct. 26, 2015, which claims priority to French Patent Application No. 1460280 filed Oct. 27, 2014, the disclosures of which are incorporated herein by reference and to which priority is claimed.

FIELD OF THE INVENTION

The present invention relates to a brush-holder regulator for a motor vehicle alternator.

BACKGROUND OF THE INVENTION

Modern alternators for motor vehicles are compact pieces of equipment in which the control and regulation devices are integrated.

It is the brush-holder associated with the collector of the rotor which mostly supports the device for regulation of the voltage produced by the alternator, constituting a brush-holder regulator assembly which is connected to the bundle of electric cables of the vehicle by means of terminals or connectors.

A brush-holder regulator of this type is described for example in patent application FR2969411 by the company VALEO EQUIPEMENTS ELECTRIQUES MOTEUR. A brush-holder regulator of this type according to the prior art comprises an electronic circuit in the form of an electronic chip incorporating an ASIC.

FIG. 1 of the present patent of invention shows another brush-holder regulator 1 according to the prior art, comprising an electronic chip 10.

In a known manner, this brush-holder regulator is produced by overmoulding with a plastic material of a circuit of conductive tracks 11 (known as the leadframe) onto which electronic components are added by gluing and welding. The circuit of tracks 11 is produced by stamping a strip of soft iron. The actual overmoulding of the circuit of tracks 11 is preceded by a step of pre-overmoulding. This step of pre-overmoulding ensures partial overmoulding of the tracks, in order to keep the arrangement of the tracks together after cutting of metal mechanical connection portions between the tracks, which metal portions are obtained from the stamping, and must be eliminated in order to form the electrical connection circuit. The final overmoulding operation makes it possible to form the casing of the brush-holder regulator which, in addition to the circuit of tracks 11, comprises two receptacles 12a, 12b for conductive brushes (not represented) which are designed to ensure electrical contacts with the collector (not represented) of the alternator, receptacles 13, 14 and 15 for the electronic components, and electrical and mechanical connection terminals 16a, 16b, 16c. The electrical and mechanical connection terminals 16a, 16b and 16c are connected electrically to the circuit of tracks 11, and permit mechanical assembly of the brush-holder regulator on a rear bearing of the alternator, and its electrical connection to the electrical supply network of the vehicle. The conductive brushes make it possible to establish an electrical connection with an excitation winding of the rotor of the alternator.

The electronic components comprise the ASIC chip 10 which is glued and connected electrically by wires 101 which are welded (so-called wire bonding technique) on the circuit of tracks 11 and discrete components 17, 18 formed by capacitors. Finally, the receptacles containing the electronic components are closed with a sealing material, thus ensuring sealed covering and mechanical protection of the components.

In this prior art, the transfer of the ASIC chip into the brush-holder regulator and its electrical connection to the circuit of tracks is a delicate and costly operation. In fact, producing wired connections by means of welded wires (wire bonding) directly on the chip requires great precision and is time-consuming.

It is therefore desirable to propose a new generation brush-holder regulator which permits a significant reduction of the costs by elimination of the wire bonding operation, and by use of electronic casings which are available from a catalogue.

SUMMARY OF THE INVENTION

The invention thus relates to a brush-holder regulator for a motor vehicle alternator, of the type comprising:
- a casing made of insulating material which can be fitted on a rear bearing of the alternator, and forms an assembly in a single piece with at least one receptacle which can contain brushes making it possible to establish an electrical connection with an excitation winding of a rotor of the alternator;
- an electronic regulation component which is connected electrically to a circuit of tracks overmoulded in the casing; and
- a cooling radiator for the electronic regulation component.

According to the invention, the electronic regulation component comprises a dorsal electrode on which the radiator is fitted, the dorsal electrode and the radiator being in electrical and thermal contact, and secured integrally on a portion of the circuit of tracks.

According to a particular characteristic, the portion on which the dorsal electrode and the radiator are secured is a portion overhanging the circuit of tracks.

According to another particular characteristic, the electronic regulation component is contained in a first receptacle of the casing, an opening of which is covered by the radiator.

According to yet another particular characteristic, the casing comprises a second receptacle containing a capacitor, an opening of which is covered by the radiator.

According to yet another particular characteristic, the radiator is formed by an aluminium wafer.

According to yet another particular characteristic, the fitting of the radiator and the dorsal electrode on the said portion of the circuit of tracks, making possible an electrical earthing junction, is ensured by means of a screw, which is preferably self-tapping.

According to yet another particular characteristic, the electronic regulation component comprises bent connection pins forming connection lugs which are connected electrically to corresponding connection areas of the circuit of tracks.

According to yet another particular characteristic, the connection lugs are connected by electric welding to the corresponding connection areas of the circuit of tracks.

According to yet another particular characteristic, the assembly of the electrical connections of the electronic components added onto the brush-holder regulator is carried out by electric welding on a single face of the circuit of tracks.

According to yet another particular characteristic, the electronic regulation component is a standard component comprising a communication port of the LIN or multifunction type.

The above few specifications of the invention will have made apparent to persons skilled in the art the advantages provided by this brush-holder regulator in comparison with the prior art.

Detailed specifications of the invention are provided in the description which follows in association with the appended drawings. It should be noted that these drawings serve the purpose simply of illustrating the text of the description, and do not constitute in any way a limitation of the scope of the invention.

BRIEF DESCRIPTION OF THE DRAWINGS

FIG. 1 is a view in perspective of a brush-holder regulator for a motor vehicle alternator according to the prior art, shown in a partially stripped-down state;

FIGS. 2a, 2b and 2c are views of a particular embodiment of a brush-holder regulator according to the invention, the brush-holder regulator being shown in these figures in different partially stripped-down states;

FIG. 5 is a partial view from above showing the welds of the lugs of the connection pins of the electronic regulation component on the circuit of tracks;

FIG. 6 is a view in perspective of the radiator wafer; and

FIGS. 7a and 7b are views in perspective showing the fitting of the electronic regulation component and the radiator wafer on the circuit of tracks.

FIG. 8 is a cross-section of FIG. 7a.

DETAILED DESCRIPTION OF THE PREFERRED EMBODIMENT(S)

Figure 3A:
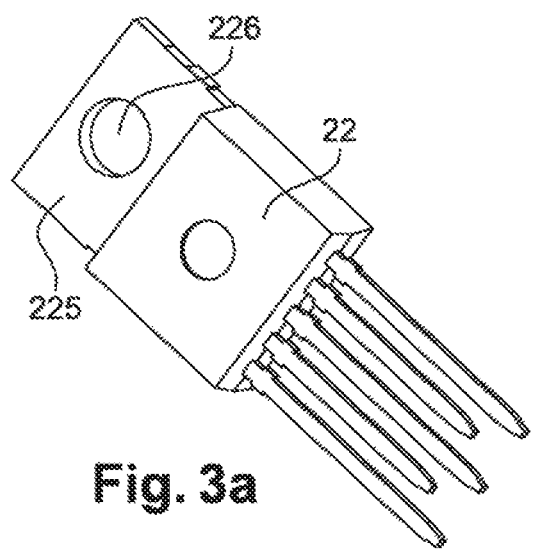
FIGS. 3a and 3b are views in perspective of the electronic regulation component contained in this particular embodiment of the brush-holder regulator according to the invention.

A particular embodiment of a brush-holder regulator 2 according to the invention is now described with reference in a first stage to FIGS. 2a, 2b and 2c.

As shown in FIGS. 2a, 2b and 2c, the brush-holder regulator 2 substantially comprises a single-piece casing 20 including receptacles 12a, 12b for conductive brushes and an overmolded circuit of tracks 21, an electronic regulation component 22, auxiliary electronic components 23a, 23b, and a cooling radiator (or radiator wafer) 24.

The casing 20 is designed such as to accommodate the regulation component 22 and the radiator wafer 24, as well as the auxiliary electronic components 23a, 23b. The circuit of tracks 21 can be produced according to different methods, and is overmoulded in order to form the casing 20.

The regulation component 22 shown in FIG. 3a is typically a component available from a catalogue, for example, in this embodiment, a component available as a standard casing of type TO220 with five pins. It can for example be a regulator of the type with a LIN VDA communication interface, as offered by the company Infineon (registered trademark) under the reference TLE8880, which can control a communication connection of the LIN type with the vehicle engine electronic control unit. Voltage regulators in a standard casing, with a communication interface of a multifunction type, are also suitable for a brush-holder regulator according to the invention.

Figure 3B:
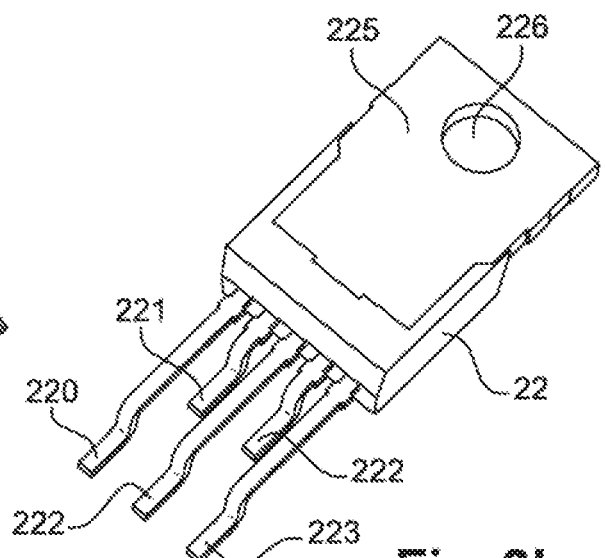
Figure 4:
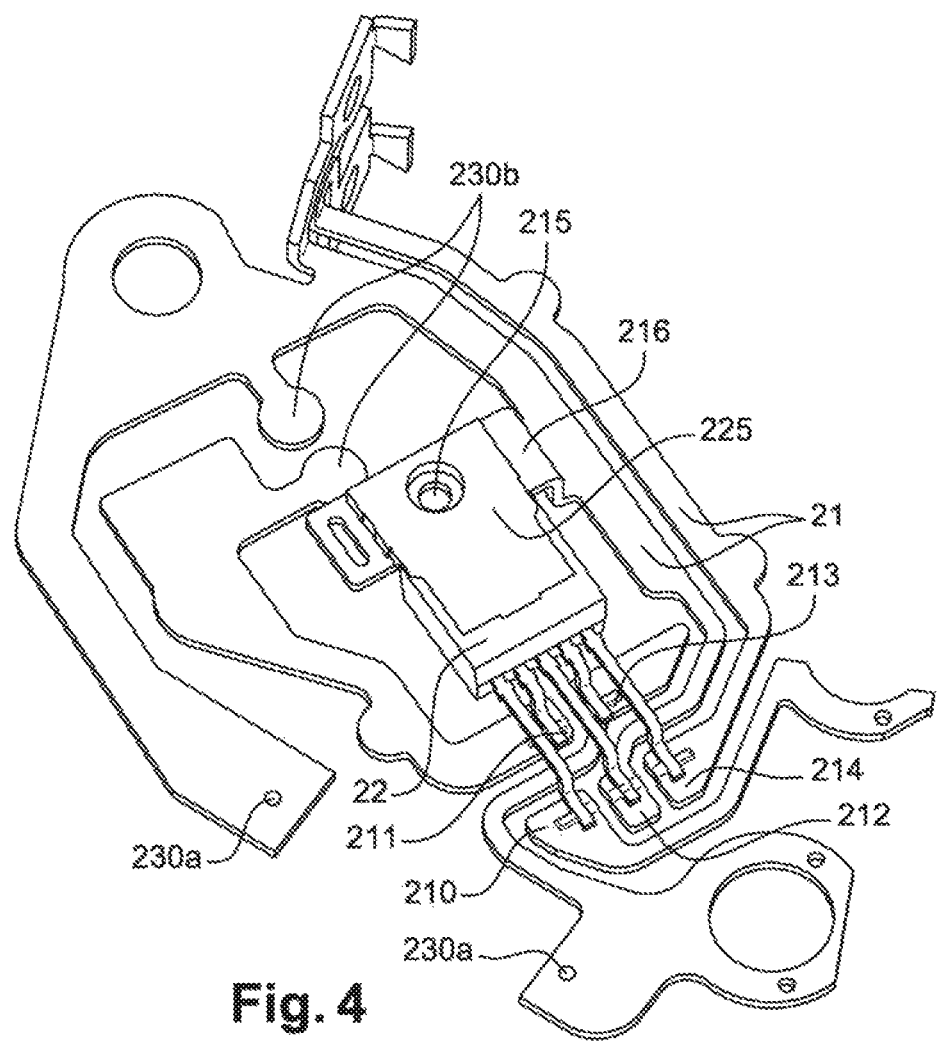
FIG. 4 is a view in perspective showing the circuit of tracks of the brush-holder regulator and fitting of the electronic regulation component on the latter.

As shown in FIG. 3b, in this particular embodiment, the regulation component 22 comprises five connection pins 220 to 224. According to the invention, the connection pins 220 to 224 are bent. In this case, the connection pins 220 to 224 each have a double bend at 90° in opposite bending directions. These bending operations carried out on the pins 220 to 224 make it possible to form at their respective ends lugs which can be welded electrically on respective welding areas 210 to 214, shown in FIGS. 4 and 5, of the circuit of tracks 21.

The regulation component 22 also comprises a dorsal electrode 225 which is provided with an orifice 226, and is designed to be secured on the circuit of tracks 21 by means of a securing screw 25, as shown in FIG. 8.

The auxiliary electronic components 23a, 23b are capacitors which substantially have filtering functions, respectively for the regulation circuit 22 and the LIN communication connection. These capacitors 23a and 23b each comprise in a known manner two connection pins which are designed to be welded electrically on respective welding areas 230a and 230b, shown in FIGS. 2c and 4.

It will be noted here that the components 22 and 23a, 23b are implanted in the regulator 2 such that the assembly of the connection lugs of the latter, which are designed to be welded electrically, are welded on a single side of the regulator, which avoids operations of overturning the regulator 2 during the production process.

The radiator wafer 24 and its fitting in the regulator 2 are shown in FIG. 6 and FIGS. 2a, 7a, 7b and 8.

The radiator wafer 24 is typically made of aluminium, and comprises an orifice 240 for the passage of the securing screw 25. As shown in cross-section in FIG. 8, the screw 25 is inserted in the orifice 240 in the radiator wafer 24 and in the orifice 226 in the dorsal electrode 225 of the regulation component 22, and is screwed into a corresponding orifice 215 in the circuit of tracks 21, on an overhanging portion 216 of the latter. The overhanging portion 216 can be seen in FIGS. 4, 7a and 7b. The radiator wafer 24 and the dorsal electrode 225 of the regulation component 22 are sandwiched and clamped between the head of the screw 25 and the overhanging portion 216. It will be noted that the screw 25 is advantageously a self-tapping screw.

The radiator wafer 24 comprises a lower face in electrical and thermal contact with the dorsal electrode 225 of the regulation component 22, and an upper face in contact with the head of the screw 25. The upper face of the radiator wafer 24 faces onto the exterior of the regulator 2, and permits cooling of the regulation component 22 by conduction and convection, the lower face of the radiator wafer 24 being in thermal contact with the dorsal electrode 225.

The dorsal electrode 225 of the regulator 2 is also in electrical and thermal contact with the overhanging portion 216 of the circuit of tracks. This thermal contact with the overhanging portion 216 also permits thermal dissipation of the calories obtained from the regulation component through a metal earthing part constituted by the circuit of tracks 21.

It will be noted that, once the radiator wafer 24 is fitted on the regulator 2, it closes an opening in the receptacle containing the regulation component 22, as well as an opening in the receptacle containing the capacitor 23b (shown in FIG. 2c). A function of protection against mechanical impacts and penetration of impurities/contaminants is also thus ensured by the radiator wafer 24.

It will be noted that the invention makes it possible to avoid interlacing of portions of the circuit of tracks, and makes it possible to obtain portions of tracks for the electric welding of the electronic regulation component which are all flat on a single plane. These characteristics facilitate the production process.

The invention now having been disclosed by means of the particular embodiment described in detail above, persons skilled in the art will be able to take advantage of the teaching contained in the present application to conceive of other embodiments of the invention suitable for particular applications of the invention. The invention thus incorporates all the possible variant embodiments, provided that the characteristics of this brush-holder regulator do not depart from the context established by the following claims.

The invention claimed is:

1. A brush-holder regulator (2) for a motor vehicle alternator, comprising:
    a casing (20) made of insulating material fitted on a rear bearing of the alternator and forming a single piece assembly with at least one receptacle (12a, 12b) for receiving brushes adapted to establish an electrical connection with an excitation winding of a rotor of the alternator;
    an electronic regulation component (22) connected electrically to a circuit of tracks (21) overmolded in the casing (20); and
    a cooling radiator (24) for the electronic regulation component,
    wherein the electronic regulation component (22) comprises a dorsal electrode (225) on which the cooling radiator (24) is fitted, the dorsal electrode (225) and the cooling radiator (24) being in electrical and thermal contact, and secured integrally on a portion (216) of the circuit of tracks (21).

2. The brush-holder regulator (2) according to claim 1, wherein the portion on which the dorsal electrode (225) and the cooling radiator (24) are secured overhangs the circuit of tracks (21).

3. The brush-holder regulator (2) according to claim 1, wherein the electronic regulation component (22) is contained in a first receptacle of the casing (20), an opening of which is covered by the cooling radiator (24).

4. The brush-holder regulator (2) according to claim 3, wherein the casing (20) comprises a second receptacle containing a capacitor (23b), an opening of which is covered by the cooling radiator (24).

5. The brush-holder regulator (2) according to claim 1, wherein the cooling radiator is formed by an aluminum wafer.

6. The brush-holder regulator (2) according to claim 1, wherein the fitting of the cooling radiator (24) and the dorsal electrode (225) on the portion (216) of the circuit of tracks (21) is ensured by a screw (25).

7. The brush-holder regulator (2) according to claim 1, wherein the electronic regulation component (22) comprises bent connection pins forming connection lugs (220 to 223) which are connected electrically to corresponding connection areas (210 to 213) of the circuit of tracks (21).

8. The brush-holder regulator (2) according to claim 7, wherein the connection lugs (220 to 223) are connected by electric welding to the corresponding connection areas (210 to 213) of the circuit of tracks (21).

9. The brush-holder regulator (2) according to claim 1, wherein an assembly of electrical connections of the electronic regulation component (22) and auxiliary electronic components (23a, 23b) added onto the brush-holder regulator (2) is carried out by an electric welding on a single face of the circuit of tracks (21).

10. The brush-holder regulator (2) according to claim 1, wherein the electronic regulation component (22) is a standard component comprising a communication port of the LIN or multifunction type.

11. The brush-holder regulator (2) according to claim 2, wherein the electronic regulation component (22) is contained in a first receptacle of the casing (20), an opening of which is covered by the cooling radiator (24).

12. The brush-holder regulator (2) according claim 2, wherein the cooling radiator is formed by an aluminum wafer.

13. The brush-holder regulator (2) according claim 3, wherein the cooling radiator is formed by an aluminum wafer.

14. The brush-holder regulator (2) according to claim 4, wherein the cooling radiator is formed by an aluminum wafer.

15. The brush-holder regulator (2) according to claim 2, wherein the fitting of the cooling radiator (24) and the dorsal electrode (225) on the portion (216) of the circuit of tracks (21) is ensured by a screw (25).

16. The brush-holder regulator (2) according to claim 3, wherein the fitting of the cooling radiator (24) and the dorsal electrode (225) on the portion (216) of the circuit of tracks (21) is ensured by a screw (25).

17. The brush-holder regulator (2) according to claim 4, wherein the fitting of the cooling radiator (24) and the dorsal electrode (225) on the portion (216) of the circuit of tracks (21) is ensured by a screw (25).

18. The brush-holder regulator (2) according to claim 5, wherein the fitting of the cooling radiator (24) and the dorsal electrode (225) on the portion (216) of the circuit of tracks (21) is ensured by a screw (25).

* * * * *